United States Patent
Park et al.

(10) Patent No.: US 12,223,164 B2
(45) Date of Patent: Feb. 11, 2025

(54) ELECTRONIC DEVICE AND CONTROL METHOD THEREOF

(71) Applicant: SAMSUNG ELECTRONICS CO., LTD., Suwon-si (KR)

(72) Inventors: Sangho Park, Suwon-si (KR); Kwangyoun Kim, Suwon-si (KR); Sooam Kim, Suwon-si (KR); Jeewoong Kim, Suwon-si (KR); Joonjae Park, Suwon-si (KR); Dockjo Yang, Suwon-si (KR); Soonbae Yang, Suwon-si (KR); Soyong Lee, Suwon-si (KR); Boeun Jang, Suwon-si (KR); Youngwoong Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 18/198,372

(22) Filed: May 17, 2023

(65) Prior Publication Data

US 2023/0289058 A1 Sep. 14, 2023

Related U.S. Application Data (63) Continuation of application No. PCT/KR2021/013803, filed on Oct. 7, 2021.

(30) Foreign Application Priority Data

Nov. 24, 2020 (KR) .................. 10-2020-0158479

(51) Int. Cl.
G06F 3/04886 (2022.01)
G06F 3/041 (2006.01)
(Continued)

(52) U.S. Cl.
CPC .......... *G06F 3/04886* (2013.01); *G06F 3/041* (2013.01); *G06F 3/044* (2013.01);
(Continued)

(58) Field of Classification Search
CPC .. G06F 3/04886; G06F 3/044; G06F 3/04817; G06F 3/167; G06F 3/041;
(Continued)

(56) References Cited

U.S. PATENT DOCUMENTS

| 7,737,957 B2 | 6/2010 | Lee et al. |
| 7,783,789 B2 | 8/2010 | Zhu et al. |

(Continued)

FOREIGN PATENT DOCUMENTS

| CN | 10111005 B | 3/2012 |
| CN | 101110005 B | 3/2012 |

(Continued)

OTHER PUBLICATIONS

International Search Report dated Jan. 25, 2022 in International Patent Application No. PCT/KR2021/013803.

(Continued)

*Primary Examiner* — Adam R. Giesy
(74) *Attorney, Agent, or Firm* — STAAS & HALSEY LLP (57) ABSTRACT

An electronic device comprises: a panel; a sensor configured to detect a user's touch with respect to at least one region among a plurality of areas in the panel; a plurality of icon members positionable to an upper portion of the at least one region from among the plurality of regions of the panel based on the user's touch on the at least one region being detected by the sensor, the plurality of icon members being configured to respectively display icons corresponding to functions performable by the electronic device; and a processor configured to perform a function corresponding to an (Continued)

icon member based on the user's touch on the at least one region detected by the sensor occurring in association with the icon member.

15 Claims, 10 Drawing Sheets

(51) Int. Cl.
*G06F 3/044* (2006.01)
*G06F 3/04817* (2022.01)
*G06F 3/16* (2006.01)
*G06F 3/0488* (2022.01)
*H05B 6/64* (2006.01)

(52) U.S. Cl.
CPC .......... *G06F 3/04817* (2013.01); *G06F 3/167* (2013.01); *G06F 3/0488* (2013.01); *H05B 6/6435* (2013.01)

(58) Field of Classification Search
CPC ........ G06F 3/16; G06F 3/0488; G06F 3/0416; H05B 6/6435
See application file for complete search history.

(56) References Cited

U.S. PATENT DOCUMENTS

| | | |
|---|---|---|
| 8,321,809 B2 | 11/2012 | Eom |
| 8,488,069 B2 | 7/2013 | Dimitrov et al. |
| 8,692,778 B2 | 4/2014 | Kim |
| 8,860,669 B2 | 10/2014 | Kim et al. |
| 9,292,098 B2 | 3/2016 | Trobrillant |
| 9,323,446 B2 | 4/2016 | Seo et al. |
| 9,342,176 B2 | 5/2016 | Kim et al. |
| 9,489,078 B2 | 11/2016 | Seo et al. |
| 9,489,080 B2 | 11/2016 | Seo et al. |
| 9,897,196 B2 | 2/2018 | Kim |
| 9,965,116 B1* | 5/2018 | Wolter .................... G07G 1/01 |
| 10,513,184 B2 | 12/2019 | Lee et al. |
| 10,706,231 B2* | 7/2020 | Kamata .................... G06F 3/023 |
| 11,036,954 B2 | 6/2021 | Lee et al. |
| 11,042,232 B2 | 6/2021 | Park |
| 2007/0252822 A1 | 11/2007 | Kim et al. |
| 2014/0160028 A1 | 6/2014 | Dimitrov et al. |
| 2015/0301736 A1 | 10/2015 | Jung et al. |
| 2016/0359325 A1* | 12/2016 | Kawata ................ H04L 12/2829 |
| 2020/0293168 A1 | 9/2020 | Kim et al. |

FOREIGN PATENT DOCUMENTS

| | | |
|---|---|---|
| EP | 3 118 712 A1 | 1/2017 |
| KR | 10-2007-0106888 | 11/2007 |
| KR | 10-0843077 | 7/2008 |
| KR | 10-1050464 | 7/2011 |
| KR | 10-1171185 | 8/2012 |
| KR | 10-2014-0024855 | 3/2014 |
| KR | 10-1499546 | 3/2015 |
| KR | 10-1527054 | 6/2015 |
| KR | 10-2015-0120730 | 10/2015 |
| KR | 10-1564332 | 10/2015 |
| KR | 10-1573698 | 12/2015 |
| KR | 10-2016-0003420 | 1/2016 |
| KR | 10-2016-0082902 | 7/2016 |
| KR | 10-2016-0129665 | 11/2016 |
| KR | 10-2019-0001145 | 1/2019 |
| KR | 10-1943427 | 1/2019 |
| KR | 10-1954233 | 3/2019 |
| KR | 10-1991862 | 6/2019 |
| KR | 10-2014273 | 8/2019 |
| KR | 10-2019-0102705 | 9/2019 |
| KR | 10-2075082 | 2/2020 |
| KR | 10-2020-0071835 | 6/2020 |
| KR | 10-2020-0109467 | 9/2020 |

OTHER PUBLICATIONS

PCT/ISA/237 dated Jan. 25, 2022 in International Patent Application No. PCT/KR2021/013803.

* cited by examiner

ELECTRONIC DEVICE AND CONTROL METHOD THEREOF

CROSS-REFERENCE TO RELATED APPLICATION(s)

This application is a continuation application, under 35 U.S.C. § 111(a), of international application No. PCT/KR2021/013803, filed on Oct. 7, 2021, which claims priority under 35 U. S. C. § 119 to Korean Patent Application No. 10-2020-0158479, filed on Nov. 24, 2020, the disclosures of which are incorporated herein by reference in their entirety.

BACKGROUND

Field

The present disclosure relates to an electronic device and a control method thereof, and more particularly, to an electronic device in which a user may freely change a position of a touch UI and a control method thereof.

Description of the Related Art

Thanks to the development of electronics technology, various types of electronic products have been developed and spread, and these electronic devices include various user interfaces (UIs) for receiving user commands. As an example of a UI for receiving a user command, touch panels that receive a user command through a user's touch have been widely used.

However, in an electronic device (e.g., household appliances, such as microwaves, ovens, and the like) of the related art in which functions provided to users are set, in the case of a touch panel for displaying menus representing functions that may be performed and receiving user touches for each menu, the position in which each menu is displayed is fixed on the touch panel and the user cannot change it, causing a problem in that the needs of users are not satisfied.

SUMMARY

According to an embodiment of the present disclosure, an electronic device includes: a panel; a sensor configured to detect a user's touch with respect to at least one region among a plurality of regions of the panel; a plurality of icon members positionable to an upper portion of the at least one region among the plurality of regions of the panel based on the user's touch on the at least one region being detected by the sensor, the plurality of icon members being configured to respectively display icons corresponding to functions performable by the electronic device; and a processor configured to perform a function corresponding to an icon member, among the plurality of icon members, based on the user's touch on the at least one region detected by the sensor occurring in association with the icon member.

The sensor may be under the panel, the plurality of icon members may have a different permittivity, respectively, and the processor may be configured to identify an icon member in association with the user's touch, among the plurality of icon members, based on a sensing value detected by the sensor.

In this case, the processor may be configured to identify the icon member in association with the user's touch based on a sum of a capacitance change of the at least one region which has a largest capacitance change, among the plurality of regions, and a capacitance change of a peripheral region of the at least one region which has the largest capacitance change.

Meanwhile, the electronic device may further include: a memory configured to store respective information associated with the at least one region, among the plurality of regions, in which the icon member among the plurality of icon members is located and function information corresponding to the at least one region, wherein the processor is configured to identify the at least one region in association with the user's touch, among the plurality of regions, identify function information corresponding to the at least one region, and perform a function corresponding to the identified function information.

Meanwhile, the electronic device may further include: a speaker, wherein the processor is configured to control the speaker to output a first guide voice to guide with positioning of the icon member among the plurality of icon members and a second guide voice to guide with a touch involving the icon member subsequent to the positioning of the icon member.

In this case, the first guide voice guides with the positioning of the icon member among the plurality of icon members, and the second guide voice guides with the touch involving the icon member subsequent to the positioning of the icon member, and the processor may be configured to control the speaker to respectively output the first guide voice and the second guide voice in association with the plurality of icon members.

In this case, the electronic device may further include: a memory, wherein the processor is configured to identify the at least one region in association with the user's touch, among the plurality of regions, after the second guide voice is output, and stores information of the at least one region in association with the user's touch in the memory as a region in which the icon member is located.

Meanwhile, the electronic device may further include: a memory, wherein the processor is configured to identify the icon member, among the plurality of icon members, based on a sensing value of the sensor after the second guide voice is output, identify the at least one region in association with the user's touch, among the plurality of regions, and store information of the at least one region in association with the user's touch as a region in which the icon member is located in the memory.

Meanwhile, the electronic device may further include: a memory, wherein the first guide voice guides the positioning of the plurality of icon members, and the second guide voice guides to sequential touch with respect to the plurality of icon members subsequent to the positioning of the plurality of icon members, and after the second guide voice is output, the processor is configured to check a region in association with the user's touch, among the plurality of regions, and an order in which the user's touch occurs, and store information of each region in association with the user's touch as a region in which the plurality of icon members are located in the memory based on the order in which the user's touch occurs.

Meanwhile, the electronic device may further include: a memory, wherein the first guide voice guides the positioning of the plurality of icon members, and the second guide voice guides different numbers of touches with respect to the plurality of icon members, and after the second guide voice is output, the processor is configured to check a region in association with the user's touch, among the plurality of regions, and a number in which the user's touch occurs, and stores information of each region in which the user's touch occurs as a region in which the plurality of icon members are located in the memory based on the number in which the user's touch occurs.

Meanwhile, a control method of an electronic device may include: guiding positioning of an icon member among a plurality of icon members to a panel, the plurality of icon members respectively displaying icons corresponding to functions performable by the electronic device to the panel; and performing a function corresponding to the icon member, among the plurality of icon members, based on a user's touch on the panel occurring in association with the icon member.

In this case, the plurality of icon members may have a different permittivity, respectively, wherein the control method may further include: identifying the icon member in association with the user's touch, among the plurality of icon members, based on a sensing value detected by a sensor configured to detect the user's touch with respect to a plurality of regions of the panel.

In this case, the identifying of the icon member in association with the user's touch may include identifying the icon member in association with the user's touch based on a sum of capacitance change of the region which has a largest capacitance change, among the plurality of regions, and a capacitance change of a peripheral region of the at least one region which has the largest capacitance change.

Meanwhile, the control method may further include: storing respective information associated with at least one region, among a plurality of regions, in which the icon member among the plurality of icon members is located, and function information corresponding to the at least one region in a memory; identifying the at least one region in association with the user's touch, among the plurality of regions; and identifying function information corresponding to the at least one region, wherein the performing of the function includes performing a function corresponding to the identified function information.

Meanwhile, the guiding may include: outputting a first guide voice to guide with positioning of the icon member among the plurality of icon members; and outputting a second guide voice to guide a touch involving the icon member subsequent to the positioning of the icon member.

Meanwhile, the first guide voice may guide the positioning of of the icon member among the plurality of icon members, and the second guide voice guides a touch involving the icon member, and the guiding may include outputting the first guide voice and the second guide voice for each of the plurality of icon members.

In this case, the control method may further include: identifying a region in which a user's touch occurs, among the plurality of regions, after the second guide voice is output, and storing information of the region in which the user's touch occurs in the memory as a region in which the attached icon member is located.

Meanwhile, each of the plurality of icon members has a different permittivity, and the control method may further include: identifying the icon member, among the plurality of icon members, based on the sensing value of the sensor after the second guide voice is output, identifying a region in which the user's touch occurs, among the plurality of regions, and storing information of the region in which the user's touch occurs as a region in which the identified icon member is located in the memory.

Meanwhile, the first guide voice may guide the positioning of the plurality of icon members and the second guide voice may guide to sequential touch the plurality of attached icon members, wherein the control method may further include: after the second guide voice is output, checking a region in which the user's touch occurs, among the plurality of regions, and an order in which the user's touch occurs, and storing information of each region in which the user's touch occurs as a region in which the plurality of icon members are located in the memory based on the order in which the user's touch occurs.

Meanwhile, the first guide voice may guide the positioning of the plurality of icon members, and the second guide voice may guide different numbers of touches with respect to the plurality of icon members, and after the second guide voice is output, wherein the control method may further include: checking a region in which the user's touch occurs, among the plurality of regions, and a number in which the user's touch occurs; and storing information of each region in which the user's touch occurs as a region in which the plurality of icon members are located in the memory based on the number in which the user's touch occurs.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The embodiments described herein are provided to assist in the understanding of the disclosure, and it is to be understood that the disclosure is not limited to the embodiments disclosed below, and that the embodiments may be implemented to various forms and various modifications may be applied thereto. However, in describing the disclosure below, if it is determined that the detailed description on a related known function or element unnecessarily obscures the gist of the disclosure, the detailed description and illustration thereof may be omitted. In addition, the accompanied drawings are not illustrated in the actual scale to assist in the understanding of the disclosure, but are illustrated so that the dimensions of some elements are exaggerated.

The terms used in the disclosure and the claims are general terms identified in consideration of the functions of the various embodiments. However, these terms may vary depending on intention, legal or technical interpretation, emergence of new technologies, and the like of those skilled in the related art. In addition, some arbitrary terms may be used. The terms may be interpreted to a meaning defined in the disclosure, and unless otherwise specified, the terms may be understood based on the overall contents and technological common sense of those skilled in the related art.

In the description of the disclosure, order of each step should be understood to be non-limiting, unless a preceding step must be performed logically and temporally before a subsequent step. In other words, except for the exceptional case above, even if a process described as a subsequent step is performed before a process described as a preceding step, the nature of the disclosure is not affected and the claim should be defined regardless of order of the steps.

It is to be understood that the expressions, such as "comprise," "may comprise," "include," or "may include" are used herein to designate a presence of a corresponding characteristic (e.g., an element, such as a number, a function, an operation, or a component), and not to preclude a presence or a possibility of additional characteristics.

It will be understood that, although the terms first, second, etc. May be used herein to describe various elements, these elements should not be limited by these terms. These terms are only used to distinguish one element from another. For example, a first element could be termed a second element, and, similarly, a second element could be termed a first element, without departing from the scope of the present disclosure Further, because elements necessary in describing each embodiment are described herein, the embodiments are not necessarily limited thereto. Accordingly, some elements may be modified or omitted, and other elements may be included. In addition, the elements may be disposed broken up in apparatuses independent from one another.

Furthermore, although the accompanied drawings and embodiments have been described in detail with reference to the descriptions disclosed in the accompanied drawings, it is to be understood that the disclosure is not limited by the embodiments.

The present disclosure provides an electronic device in which a plurality of icon members corresponding to functions that may be performed in the electronic device are attachable to arbitrary positions on a touch panel and a control method thereof.

The disclosure will be described in detail below with reference to the accompanying drawings.

Figure 1:
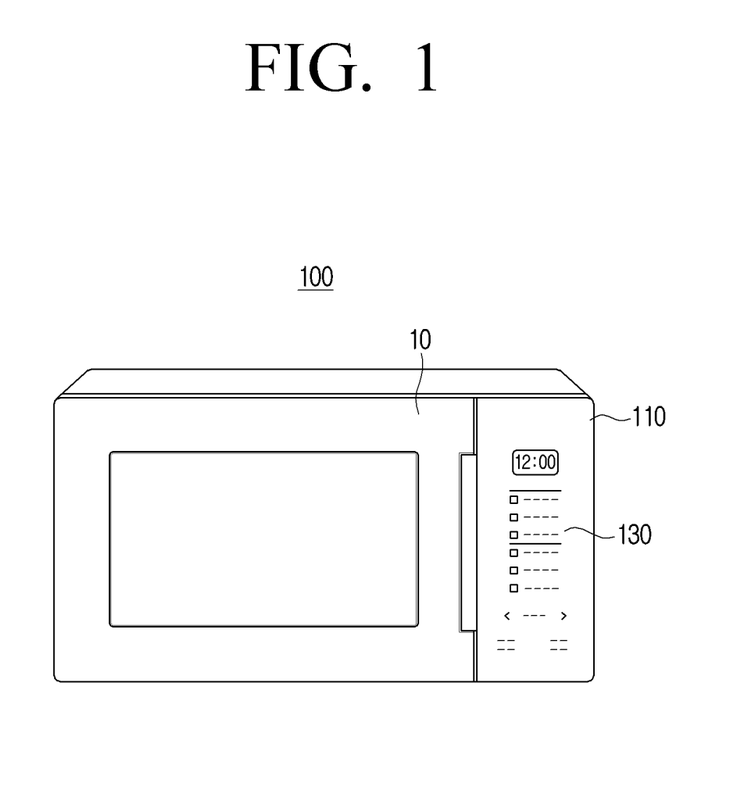
FIG. 1 is a diagram schematically illustrating an electronic device according to an embodiment of the present disclosure.

FIG. 1 is a diagram schematically illustrating an electronic device according to an embodiment of the present disclosure.

Referring to FIG. 1, an electronic device 100 may include a body 10, a panel 110, and a plurality of icon members 130 attachable to an upper portion of the panel 110.

The electronic device 100 may be various devices that provide services to users by performing various functions. For example, the electronic device 100 may be implemented as a microwave, an oven, an induction stove, a refrigerator, a washing machine, a dryer, an air conditioner, a vacuum cleaner, a TV, a desktop PC, a laptop computer, a smartphone, a tablet PC, a wearable device, and the like. However, the electronic device 100 is not limited thereto, and the electronic device 100 may be any device as long as it receives a user's touch input through a touch panel. FIG. 1 illustrates an example in which the electronic device 100 is implemented as a microwave.

The panel 110 may be a touch panel displaying icons representing functions that may be performed in order to display services that may be provided to a user, and for receiving a user's touch input. The panel 110 is disposed on the front of the main body 10, thereby increasing user accessibility.

The electronic device 100 may perform a function corresponding to a corresponding icon according to a user's touch input for each icon provided on the panel 110.

Hereinafter, the plurality of icon members 130 attached to the panel 110 will be described with reference to FIG. 2.

Figure 2:
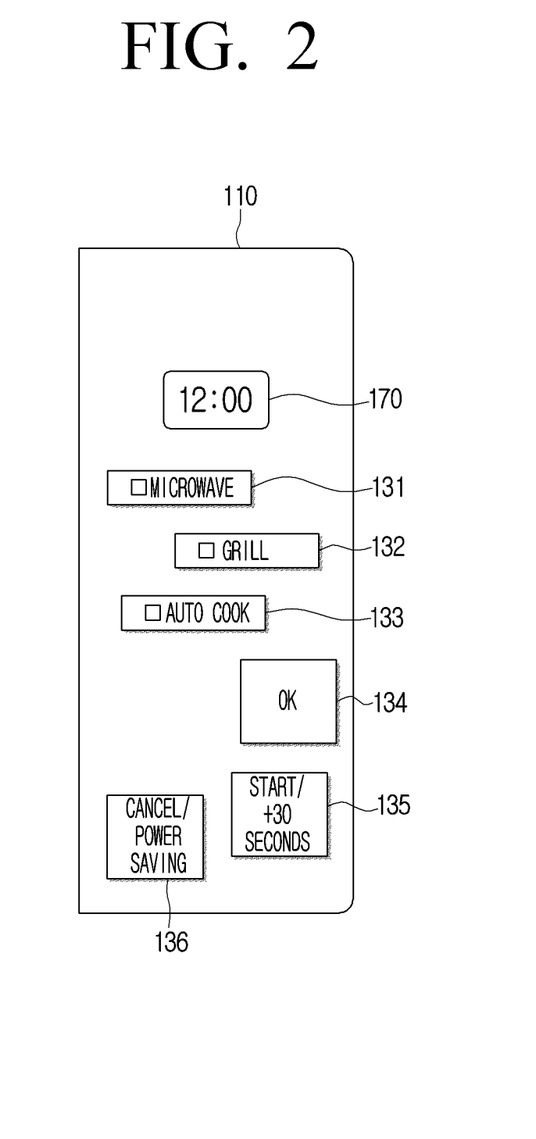
FIG. 2 is a diagram illustrating a plurality of icon members attached at random positions on a panel of an electronic device according to an embodiment of the present disclosure.

FIG. 2 is a diagram illustrating a plurality of icon members attached at random positions on a panel of an electronic device according to an embodiment of the present disclosure.

Referring to FIG. 2, for example, in a case in which the electronic device 100 is a microwave, in the plurality of icon members 130, the electronic device 100, icons corresponding to various functions provided in the electronic device 100, such as a microwave 131, a grill 132, and an automatic cooking 133 may be shown or icons corresponding to a user's instruction for controlling the electronic device 100, such as OK 134, start 135, and cancel/power saving 136 may be shown.

In this case, the icon may include at least one of an image and text, and may be displayed in a printed form on the icon member 130. However, the present disclosure is not limited thereto, and the icon may be displayed on the icon member 130 in a three-dimensional form, such as embossing or intaglio.

The electronic device 100 may identify the attachment position of each of the plurality of icon members 130 attached to the panel 110 and store position information of each icon member 130 in a memory 150. Accordingly, when the user touches an icon member, the electronic device 100 may identify the icon member in which the user's touch occurs by matching a touch position with the position information of each of the plurality of icon members 130, and performs a function corresponding thereto. Details thereof will be described below with reference to the drawings.

Figure 3:
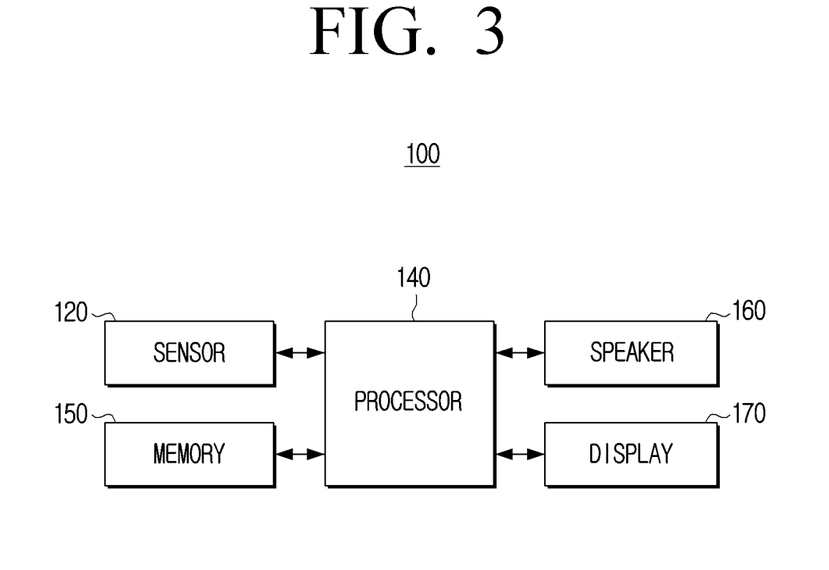
FIG. 3 is a block diagram illustrating a configuration of an electronic device according to an embodiment of the present disclosure.

FIG. 3 is a block diagram illustrating a configuration of an electronic device according to an embodiment of the present disclosure.

Referring to FIG. 3, the electronic device 100 may include a sensor 120, a processor 140, the memory 150, a speaker 160, and a display 170.

The sensor 120 may be disposed below the panel 110 and may detect a user's touch on each of a plurality of regions of the panel 110, and may generate and output an electrical signal based on a sensing result. The sensor 120 may transmit an electrical signal to the processor 140 or store a detection result in the memory 150 of the electronic device 100 or an external device.

The sensor 120 may be a capacitive sensor that detects capacitance. However, the present disclosure is not limited thereto, and the sensor 120 may be implemented as various types of sensors capable of detecting a touch input. The electronic device 100 may identify the position in which the user's touch occurs through a sensing value of the sensor 120 and may check the attachment positions of the plurality of icon members 130. Details of an operation of the electronic device 100 to check position information of each of the plurality of icon members 130 through the sensor 120 detecting a user's touch will be described below with reference to FIGS. 5 and 6.

The processor 140 may control overall operations of the electronic device 100. To this end, the processor 140 may include RAM (not shown), ROM (not shown), a graphics processing unit (not shown), a main CPU (not shown), first to n interfaces (not shown), and a bus (not shown). At this time, the RAM (not shown), the ROM (not shown), the graphics processing unit (not shown), the main CPU (not shown), the first to n interfaces (not shown), etc. may be connected to each other through a bus (not shown).

When a user's touch occurs on one icon member among the plurality of icon members 130, the processor 140 may perform a function corresponding to the icon member in which the user's touch occurs. For example, the processor 140 may identify a region in which a user's touch occurs among a plurality of regions of the panel 110 based on a sensing value of the sensor 120, identify function information corresponding to the identified region, and perform a function corresponding to the identified function information.

Meanwhile, the processor 140 may attach the plurality of icon members 130 to the panel 110 and control an output interface, such as the speaker 160, the display 170, or the like to provide a guide message guiding to touch the attached icon members 130. Details thereof will be described below with reference to FIGS. 7 to 9.

The memory 150 may store various instructions, programs, or data necessary for the operation of the electronic device 100 or the processor 140. For example, information acquired by the sensor 120 and data received from an external electronic device (not shown) may be stored in the memory 150.

The memory 150 may be implemented as a volatile memory, such as static random access memory (S-RAM) and dynamic random access memory (D-RAM), a non-volatile memory, such as flash memory, read only memory (ROM), erasable programmable read only memory (EPROM), and electrically erasable programmable read only memory (EEPROM) or the like, a hard disk drive (HDD), or a solid state drive (SSD). The memory 150 may be accessed by the processor 140, and reading/writing/modifying/deleting/updating of data may be performed by the processor 140. The term memory of the present disclosure may include the memory 150, RAM (not shown) in the processor 140, ROM (not shown), or a memory card (not shown) mounted in the electronic device 100 (e.g., a micro SD car, a memory stick, etc.).

Here, the processor 140 and the memory 150 may be implemented as physically separated components, or may be implemented as a single component such that the processor 140 includes the memory 150. Also, the processor 140 may be implemented as a single system including a single component or a plurality of components. The memory 150 may also be implemented as a single system including a single component or a plurality of components.

The memory 150 may store regions in which the plurality of icon members 130 are located, among a plurality of regions of the panel 110, and function information corresponding to the regions.

For example, the processor 140 may attach a plurality of icon members 130 to the panel 110, provide a guide message for guiding the user to touch the attached icon members 130, identify a region in which user's touch occurs, among the plurality of regions, and store the region in which the user's touch occurs, in the memory 150 as a region in which the attached icon member is located.

Accordingly, the electronic device 100 may identify and store the position of each icon member 130 even if the user attaches the plurality of icon members 130 to an arbitrary position on the panel 110, and thereafter, when a user's touch occurs on a specific icon member, the electronic device 100 may identify an icon member in which the user's touch occurs by matching the region in which the user's touch occurs to position information of the plurality of icon members 130 stored in the memory 150, thereby performing a function corresponding to the icon member.

The speaker 160 may be built in the electronic device 100 and output not only various types of audio data subjected to various processing operations, such as decoding, amplification, and noise filtering, by an audio processing unit (not shown) but also various notification sounds or voice messages directly as sound.

For example, the speaker 160 may output a guide voice guiding to attach a plurality of icon members 130 to the panel 110 and to touch the attached icon member 130 under the control of the processor 140.

In this case, the speaker 160 may sequentially output a first guide voice for guiding attachment of the plurality of icon members 130 and a second guide voice for guiding to touch the attached icon member. Details thereof will be described below with reference to FIGS. 7 to 9.

The display 170 may display various information. Specifically, the display 170 may display image data processed by an image processing unit (not shown) in a display region (or display).

For example, the display 170 may display a guide message for attaching a plurality of icon members 130 to the panel 110 and guiding the user to touch the attached icon members 130 under the control of the processor 140.

At least a portion of the display 170 may be coupled to at least one of front surface, side surface, upper surface, and rear surface regions of the electronic device 100 in the form of a flexible display in which the display may be bent or bowed, a foldable display in which the display may be folded, and a rollable display in which the display may be rolled. However, the present disclosure is not limited thereto, and the display 170 may be implemented in an external form rather than being built in the electronic device 100, and image data may also be displayed on the external display connected to the electronic device 100 by wire or wirelessly.

To this end, the display 170 may be implemented in the form of a liquid crystal display (LCD), light emitting display (LED), organic light emitting display (OLED), micro LED, electronic ink (e-ink), or the like, but this is only an example and the present disclosure is not limited thereto and may be variously modified and implemented.

Figure 4:
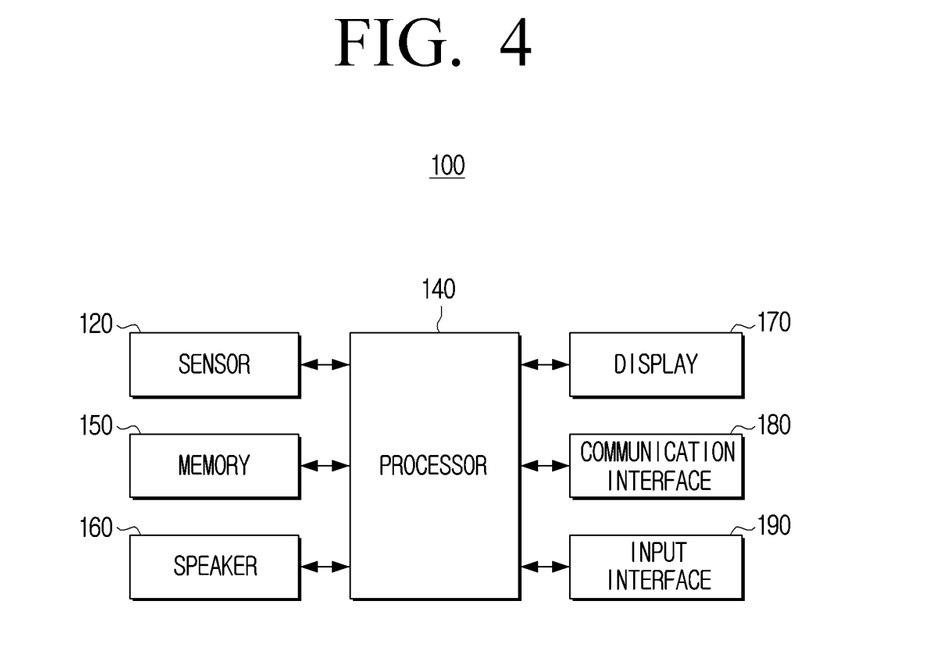
FIG. 4 is a block diagram illustrating a detailed configuration of an electronic device according to an embodiment of the present disclosure.

FIG. 4 is a block diagram illustrating a detailed configuration of an electronic device according to an embodiment of the present disclosure.

Referring to FIG. 4, the electronic device 100 may further include communication interface 180 and an input interface 190, in addition to the sensor 120, the processor 140, the memory 150, the speaker 160, and the display 170. Among the components shown in FIG. 3, detailed descriptions of components which are the same as those shown in FIG. 2 will be omitted.

The communication interface 180 may transmit/receive various types of data by communicating with an external device (e.g., a server, a smartphone, etc.) according to various types of communication methods. To this end, the communication interface 180 may include at least one of a Bluetooth chip (not shown), a Wi-Fi chip (not shown), a wireless communication chip (not shown), and a near-field communication (NFC) chip (not shown) performing wireless communication, and an Ethernet module (not shown) and a USB module (not shown) performing wired communication. In this case, the Ethernet module and the USB module performing wired communication may communicate with an external device through an input/output (I/O) port (not shown).

Here, the I/O port (not shown) may be implemented as a wired port, such as an HDMI port, a display port, an RGB port, a digital visual interface (DVI) port, a thunderbolt, a LAN port, a USB port, a lightning cable port, and a component port. The I/O ports may transmit and receive various types of data by communicating with various types of external devices through respective communication standards.

The input interface 190 is a component capable of receiving various types of user commands from a user, and may transmit the received user commands to the processor 140. For example, the processor 140 may receive a user command for performing a specific function of the electronic device 100 through the input interface 190.

The input interface 190 may include, for example, a touch panel or a key. The touch panel may use at least one of, for example, a capacitive type, a resistive type, an infrared type, or an ultrasonic type, and may include a control circuit therefor. The touch panel may further include a tactile layer to provide a tactile response to the user. Keys may be implemented through, for example, a physical button method, an optical method, or a virtual keypad method combined with a touch panel. Meanwhile, the input interface 190 may receive a user command through an external device (not shown), such as a keyboard, mouse, smartphone, etc. connected by wire or wirelessly.

The input interface 190 may directly receive the user's voice through a built-in or external microphone of the electronic device 100, and convert the user's voice, which is an analog signal, into a digital signal by a digital converter (not shown) to obtain an audio signal. Also, as an embodiment, the input interface 190 may receive an analog signal of a user's voice or an audio signal obtained by digitally converting the user's voice from an external device (not shown), such as a smartphone connected by wire or wirelessly. In this case, the input interface 190 or the processor 140 may convert the user's voice into text data, such as speech-to-text (STT), using various speech recognition algorithms, and may interpret the text data to recognize a meaning thereof, and execute a command according to the recognized meaning.

When the input interface 190 performs wired communication, communication may be performed with an external device through the I/O port (not shown) described above.

Figure 5:
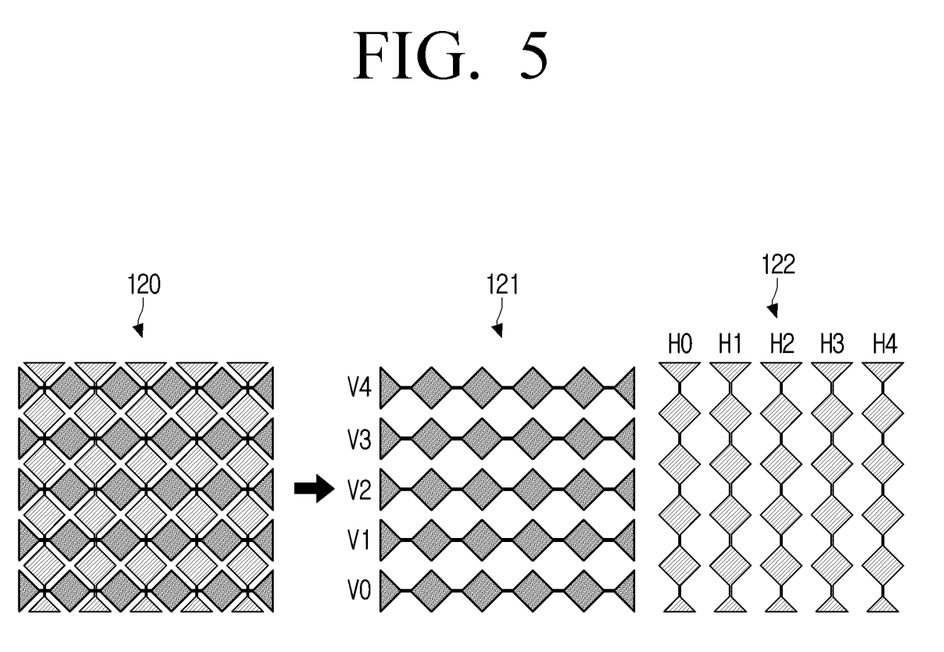
FIG. 5 is a diagram illustrating a configuration of a sensor according to an embodiment of the present disclosure.

FIG. 5 is a diagram illustrating a configuration of a sensor according to an embodiment of the present disclosure.

Referring to FIG. 5, the sensor 120 may include a first sensor 121 detecting coordinates of a region in which a user's touch occurs in a horizontal direction (an X-axis direction) and a second sensor 122 detecting coordinates in a vertical direction (a Y-axis direction). Accordingly, the processor 140 may check the region in which the user's touch occurs based on the sensing value of the sensor 120.

Figure 6:
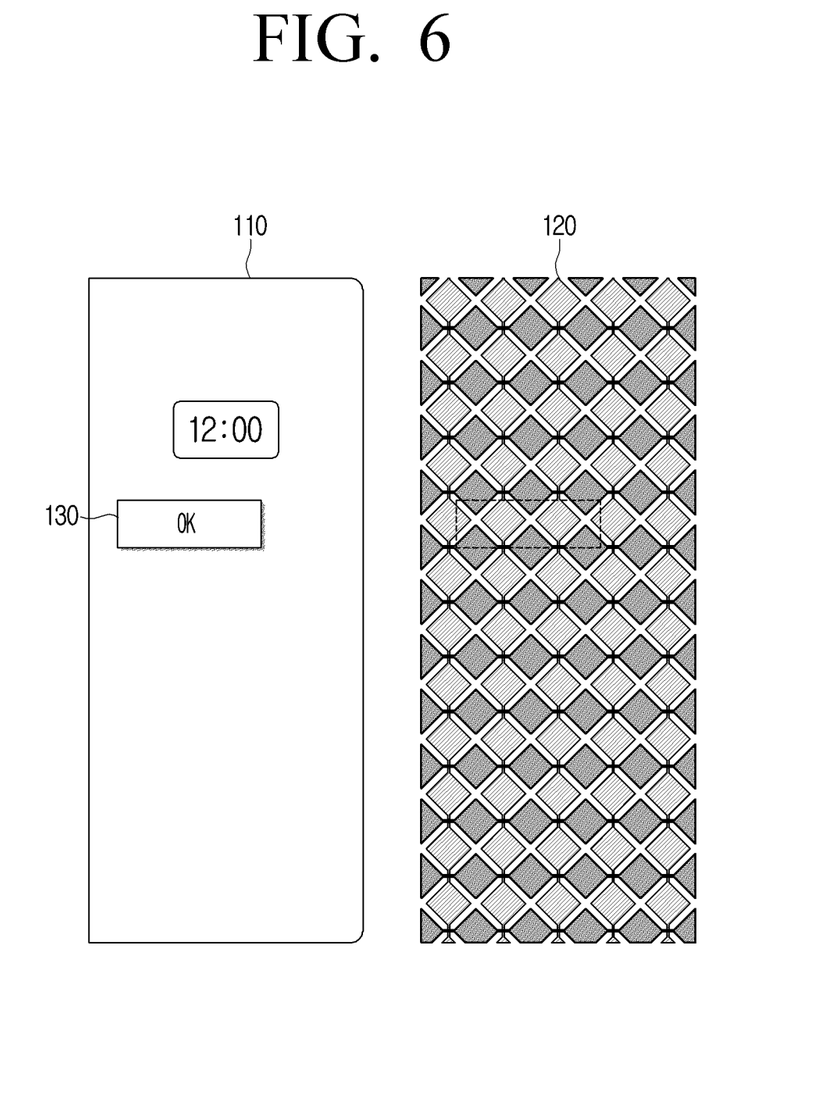
FIG. 6 is a diagram illustrating an operation of sensing a user's touch on at least one region among a plurality of regions of a panel by a sensor according to an embodiment of the present disclosure.

FIG. 6 is a diagram illustrating an operation of sensing a user's touch on at least one region among a plurality of regions of a panel by a sensor according to an embodiment of the present disclosure.

Referring to FIG. 6, when the icon member 130 is attached to the panel 110 and a user's touch applied to the attached icon member 130 occurs, the processor 140 may identify a region in which the user's touch occurs based on a sensing value of the sensor 120 disposed below the panel 110.

In this case, the processor 140 may determine that a user's touch occurs in one or more regions among a plurality of regions of the panel 110 according to a size of the icon member 130.

Meanwhile, each of the plurality of icon members 130 may have a different permittivity. To this end, the plurality of icon members 130 may be manufactured to have different sizes, thicknesses, areas, materials, and the like, respectively.

If the plurality of icon members 130 have different permittivity, capacitance change values detected through the sensor 120 may be different when a user touches each icon member 130. Accordingly, the processor 140 may identify an icon member in which the user's touch occurs, among the plurality of icon members 130, based on the sensing value detected through the sensor 120 detecting the user's touch with respect to each of the plurality of regions of the panel 110. For example, an icon member in which a user's touch occurs may be identified based on the sum of a capacitance change of a region having the largest capacitance change, among a plurality of regions of the panel 110, and a peripheral region of the region having the largest capacitance change.

Accordingly, the plurality of icon members 130 attached to the panel 110 may be identified, and based on this, information on a position in which each icon member 130 is attached on the panel 110 may be obtained.

Meanwhile, the electronic device 100 may output a first guide voice for guiding attachment of a plurality of icon members and a second guide voice for guiding to touch the attached icon member 130. This will be described in detail with reference to FIGS. 7 to 9 hereinafter.

Figure 7:
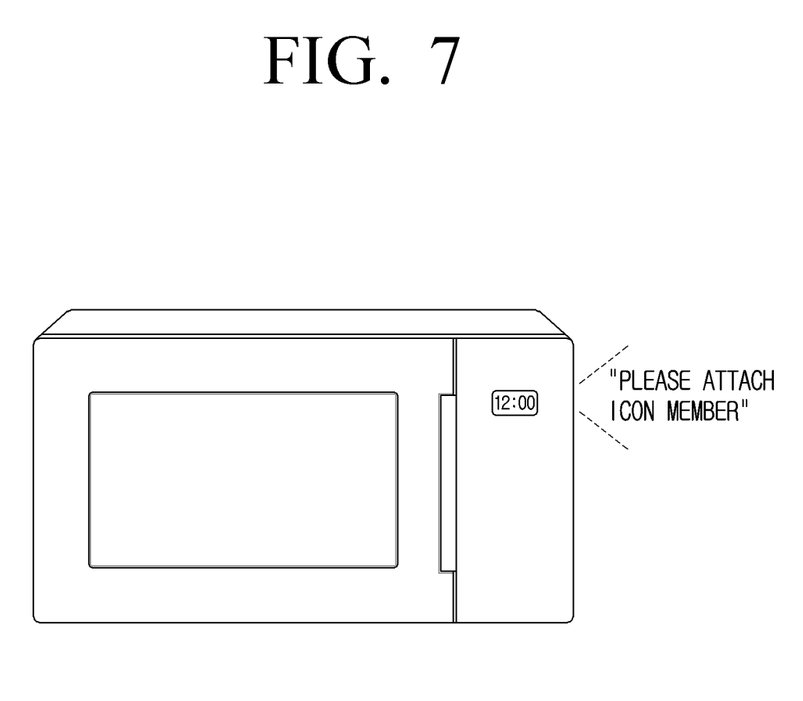
FIG. 7 is a diagram illustrating a first guide voice for guiding attachment of a plurality of icon members.
Figure 8:
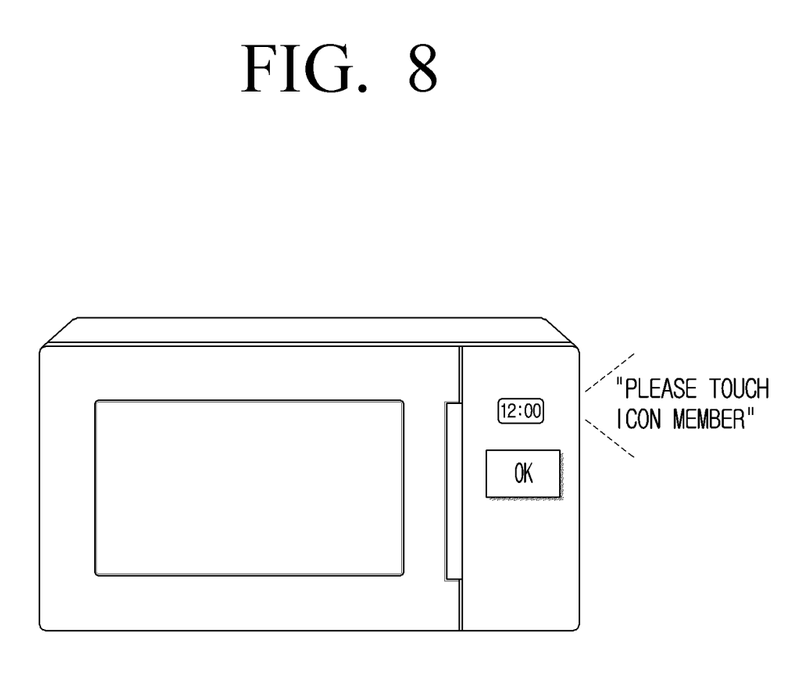
FIG. 8 is a diagram illustrating a second guide voice for guiding a user to touch an attached icon member.
Figure 9:
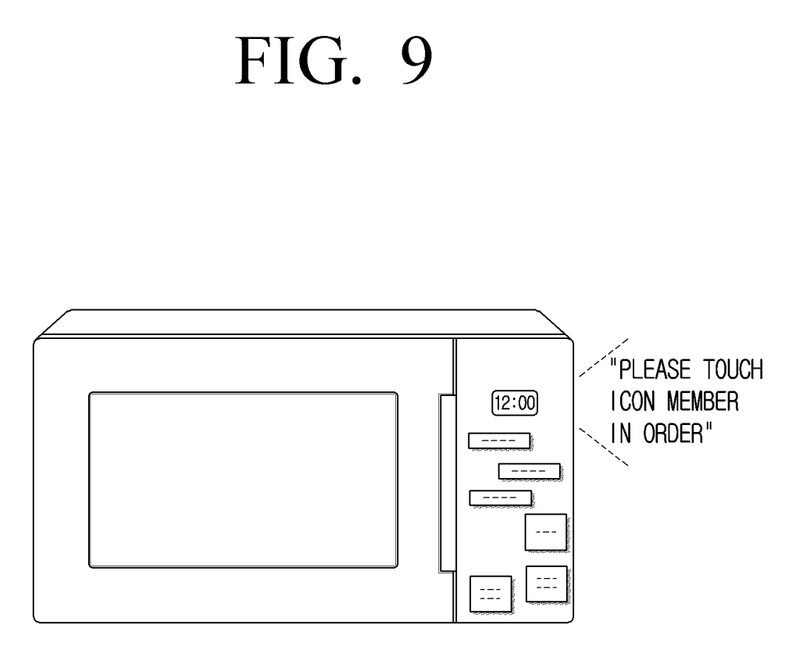
FIG. 9 is a diagram illustrating another example of a second guide voice.

FIG. 7 is a diagram illustrating a first guide voice for guiding attachment of a plurality of icon members, and FIGS. 8 and 9 are diagrams illustrating a second guide voice for guiding to touch the attached icon members.

Referring to FIG. 7, the electronic device 100 may output the first guide voice guiding attachment of the icon member through a speaker.

Here, the first guide voice may guide attachment of one icon member among the plurality of icon members 130 or guide attachment of all of the plurality of icon members 130.

When the first guide voice guides the attachment of one icon member, the electronic device 100 may guide the attachment of a predetermined icon member, for example, an "OK" icon member. The user may attach the "OK" icon member to a desired position on the panel 110 according to the first guide voice guiding the attachment of the "OK" icon member. Also, referring to FIG. 8, the electronic device 100 may output the second guide voice guiding the user to touch the "OK" icon member. When the user touches the "OK" icon member according to the second guide voice, the electronic device 100 may detect the position in which the user's touch occurs through the sensor 120 and store the region in which the user's touch occurs as a region in which the "OK" icon member is located in the memory 150.

When the first guide voice guides attachment of all of the plurality of icon members 130, the user may attach the plurality of icon members 130 to desired positions on the panel 110 according to the first guide voice. Also, referring to FIG. 9, the electronic device 100 may output the second guide voice guiding to touch the plurality of icon members 130 in a predetermined order. When the user touches the plurality of icon members 130 in the predetermined order according to the second guide voice, the electronic device 100 may check the region in which the user's touch occurs and the order in which the user's touch occurs through the sensor 120, and store the regions in which user's touch occurs as regions in which each of the plurality of icon members 130 are located based on the order in which the user's touch occurs in the memory 150.

Meanwhile, when the first guide voice guides attachment of all of the plurality of icon members 130, the second guide voice may guide the plurality of attached icon members 130 to be touched, respectively, by different number of times. When the user touches the plurality of icon members 130 by a predetermined number of times according to the second guide voice, the electronic device 100 may identify the region in which the user's touch occurs and the number of times the user's touch occurs through the sensor 120, and may store the regions in which the user's touch occurs as regions in which each of the plurality of icon members 130 are located in the memory 150 based on the number of times user's touch occurs.

Figure 10:
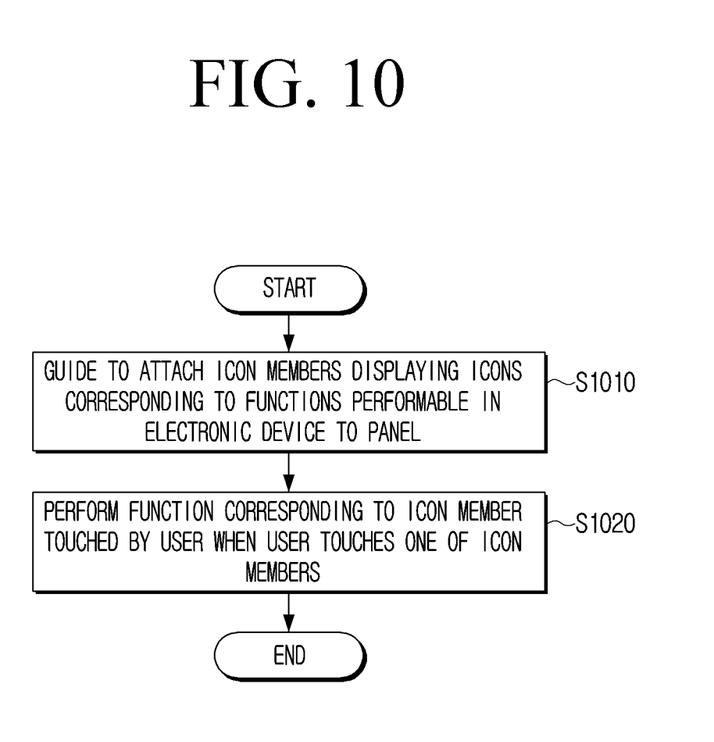
FIG. 10 is a diagram illustrating a control method of an electronic device according to an embodiment of the present disclosure.

FIG. 10 is a diagram illustrating a control method of an electronic device according to an embodiment of the present disclosure.

Referring to FIG. 10, the control method of the electronic device 100 according to an embodiment of the present disclosure may include guiding attachment of a plurality of icon members 130 in which icons corresponding functions performable in the electronic device 100 are shown to the panel 110 (S1010) and performing, when a user's touch occurs on one of the plurality of icon members 130, a function corresponding to the icon member on which the user's touch occurs.

First, the electronic device 100 may guide attachment of the plurality of icon members 130 on which icons corresponding to functions that may be performed are shown to the panel 110 in operation S1010.

Here, each of the plurality of icon members 130 may have a different permittivity. In this case, when a user touches each icon member 130, a capacitance change value detected through the sensor 120 may be different.

The electronic device 100 may identify an icon member in which the user's touch occurs, among a plurality of icon members 130, based on a sensing value detected through the sensor 120 that detects the user's touch on each of a plurality of regions of the panel 110.

For example, an icon member in which the user's touch occurs may be identified based on the sum of a capacitance change of a region having the largest capacitance change, among a plurality of regions of the panel 110, and a capacitance change of a peripheral region of the region having the largest capacitance change.

Accordingly, THE plurality of icon members 130 attached to the panel 110 may be identified, and based on this, information on the position in which each icon member 130 is attached on the panel 110 may be obtained.

Meanwhile, the electronic device 100 may output a first guide voice for guiding attachment of a plurality of icon members and a second guide voice for guiding to touch the attached icon member 130.

Here, the first guide voice guides attachment of one icon member among the plurality of icon members 130, the second guide voice may guide to touch the attached icon member, and the electronic device 100 may output the first guide voice and the second guide voice for each of the plurality of icon members. In this case, after the second guide voice is output, the electronic device 100 may identify a region in which a user's touch occurs, among a plurality of regions, and store the region in which the user's touch occurs as a region in which the attached icon member 130 is located in the memory 150. Accordingly, the electronic device 100 may sequentially check the position information to which each icon member 130 is attached based on the region in which the user's touch occurs and store the position information.

As another example, the first guide voice may guide attachment of the plurality of icon members 130, and the second guide voice may guide to sequentially touch the plurality of attached icon members 130. In this case, after the second guide voice is output, the electronic device 100 may identify the region in which the user's touch occurs, among the plurality of regions, and the order in which the user's touch occurs, and store the region in which the user's touch occurs as a region in which the plurality of icon members 130 are located in the memory 150 based on the order in which the user's touch occurs.

As another example, the first guide voice may guide attachment of the plurality of icon members 130, and the second guide voice may guide to touch the plurality of attached icon members 130, respectively, by different number of times. In this case, after the second guide voice is output, the electronic device 100 may identify the region in which the user's touch occurs, among the plurality of regions, and the number of times the user's touch occurs, and store the region in which the user's touch occurs as a region in which each of the plurality of icon members 130 are located in the memory based on the number of times the user's touch occurs.

Then, when a user's touch occurs on one icon member among the plurality of icon members 130, the electronic device 100 may perform a function corresponding to the icon member in which the user's touch occurs (S1020).

Here, the electronic device 100 may identify a position in which the user's touch occurs, match the identified position to the attached position information of each icon member 130 stored in the memory 150, identify the icon member in which the user's touch occurs, and perform a function corresponding thereto.

That is, the electronic device 100 may store the region in which the plurality of icon members 130 are located, among the plurality of regions of the panel 110, and function information corresponding to the region in the memory 150, identify the region in which the user's occurs, among the plurality of regions, and identify function information corresponding to the identified region. Also, the electronic device 100 may perform a function corresponding to the identified function information.

Various embodiments of the disclosure may be implemented by software (e.g., the program 140) including an instruction stored in a machine-readable storage media readable by a machine (e.g., a computer). The machine may be a device that calls the instruction from the machine-readable storage media and operates depending on the called instruction and may include the electronic device (e.g., a microwave). When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to embodiments, the methods according to various embodiments disclosure in this document may be included in a computer program product and provided. The computer program product may be traded as goods between a seller and a purchaser. The computer program product may be distributed as a device-readable storage medium (e.g., compact disk read only memory (CD-ROM)) or online through an application store (e.g., play store™). In the case of online distribution, at least part of the computer program product may be temporarily stored or temporarily created in a storage medium such as a server of a manufacturer, a server of an application store, or a memory of a relay server.

While the present disclosure has been described and illustrated with reference to the preferred embodiments, the present disclosure is not limited to the above-described specific embodiments, and it will be understood that various modifications and variations may be made therein by those skilled in the art to which the present disclosure pertains, without departing from the scope of the present disclosure as defined by the appended claims. These modifications and variations should not be understood separately from the technical spirit and prospect of the present disclosure.

What is claimed is:

1. An electronic device comprising:
a panel including a plurality of regions on which a plurality of icon members are positionable, respectively;
a sensor configured to detect a user's touch with respect to at least one region among the plurality of regions of the panel;
a plurality of icon members, positionable to a corresponding position on an upper portion of the at least one region among the plurality of regions of the panel, and configured to respectively display icons corresponding to functions performable by the electronic device; and
a processor configured to:
identify a position of an icon member which is selected from among the plurality of icon members, the position of the icon member being assigned by the user's touch on the panel based on the user's touch on the at least one region detected by the sensor being identified as a sensing value of the icon member among sensing values uniquely identifying the plurality of icon members; and
control the electronic device to perform a function corresponding to the icon member, among the plurality of icon members, based on the user's touch on the at least one region detected by the sensor occurring in association with the icon member.

2. The electronic device of claim 1, wherein the sensor is under the panel,
the plurality of icon members have a different permittivity, respectively, and the processor is configured to identify the icon member in association with the user's touch, among the plurality of icon members, based on a sensing value detected by the sensor.

3. The electronic device of claim 2, wherein the processor is configured to identify the icon member in association with the user's touch based on a sum of a capacitance change of the at least one region which has a largest capacitance change, among the plurality of regions, and a capacitance change of a peripheral region of the at least one region which has the largest capacitance change.

4. The electronic device of claim 1, further comprising:
a memory configured to store respective information associated with the at least one region, among the plurality of regions, in which the icon member among the plurality of icon members is located and function information corresponding to the at least one region,
wherein the processor is configured to identify the at least one region in association with the user's touch, among the plurality of regions, identify function information corresponding to the at least one region, and perform a function corresponding to the identified function information.

5. The electronic device of claim 1, further comprising:
a speaker,
wherein the processor is configured to control the speaker to output a first guide voice to guide with positioning of the icon member among the plurality of icon members and a second guide voice to guide with a touch involving the icon member subsequent to the positioning of the icon member.

6. The electronic device of claim 5, wherein
the first guide voice guides with the positioning of the icon member among the plurality of icon members, and the second guide voice guides with the touch involving the icon member subsequent to the positioning of the icon member, and
the processor is configured to control the speaker to respectively output the first guide voice and the second guide voice in association with the plurality of icon members.

7. The electronic device of claim 6, further comprising:
a memory,
wherein the processor is configured to identify the at least one region in association with the user's touch, among the plurality of regions, after the second guide voice is output, and stores information of the at least one region in association with the user's touch in the memory as a region in which the icon member is located.

8. The electronic device of claim 5, further comprising:
a memory,
wherein the processor is configured to identify the icon member, among the plurality of icon members, based on a sensing value of the sensor after the second guide voice is output, identify the at least one region in association with the user's touch, among the plurality of regions, and store information of the at least one region in association with the user's touch as a region in which the icon member is located in the memory.

9. The electronic device of claim 5, further comprising:
a memory,
wherein the first guide voice guides the positioning of the plurality of icon members, and the second guide voice guides sequential touch with respect to the plurality of icon members subsequent to the positioning of the plurality of icon members, and
after the second guide voice is output, the processor is configured to check a region in association with the user's touch, among the plurality of regions, and an order in which the user's touch occurs, and store information of each region in association with the user's touch occurs as a region in which the plurality of icon members are located in the memory based on the order in which the user's touch occurs.

10. The electronic device of claim 5, further comprising:
a memory,
wherein the first guide voice guides the positioning of the plurality of icon members, and the second guide voice guides different numbers of touches with respect to the plurality of icon members, and after the second guide voice is output, the processor is configured to check a region in association with the user's touch, among the plurality of regions, and a number in which the user's touch occurs, and store information of each region in which the user's touch occurs as a region in which the plurality of icon members are located in the memory based on the number in which the user's touch occurs.

11. A control method of an electronic device, the control method comprising:

guiding positioning of an icon member among a plurality of icon members to a panel, the plurality of icon members respectively displaying icons corresponding to functions performable by the electronic device to the panel and the positioning of the icon member, which is selected from among the plurality of icon members, being changeable by a user's touch on the panel based on the user's touch on at least one region detected by a sensor being identifed as a sensing value of the icon member among sensing values uniquely identifying the plurality of icon members; and performing a function corresponding to the icon member, among the plurality of icon members, based on a user's touch on the panel occurring in association with the icon member.

12. The control method of claim 11, wherein the plurality of icon members have a different permittivity, respectively, and wherein the control method further comprises:

identifying the icon member in association with the user's touch, among the plurality of icon members, based on a sensing value detected by a sensor configured to detect the user's touch with respect to a plurality of regions of the panel.

13. The control method of claim 12, wherein the identifying of the icon member in association with the user's touch comprises:

identifying the icon member in association with the user's touch occurs based on a sum of capacitance change of at least one region which has a largest capacitance change, among the plurality of regions, and a capacitance change of a peripheral region of the at least one region which has the largest capacitance change.

14. The control method of claim 11, further comprising:

storing respective information associated with at least one region, among a plurality of regions, in which the icon member among the plurality of icon members is located, and function information corresponding to the at least one region in a memory;

identifying the at least one region in association with the user's touch, among the plurality of regions; and identifying function information corresponding to the at least one region, wherein the performing of the function comprises performing a function corresponding to the identified function information.

15. The control method of claim 11, wherein the guiding comprises:

outputting a first guide voice to guide with positioning of the icon member among the plurality of icon members; and outputting a second guide voice to guide a touch involving the icon member subsequent to the positioning of the icon member.

\* \* \* \* \*